May 17, 1966 A. ISMACH 3,251,359
AUTOMATIC INTERMITTENT POSITIVE PRESSURE VENTILATORS
Filed April 25, 1963 3 Sheets-Sheet 1
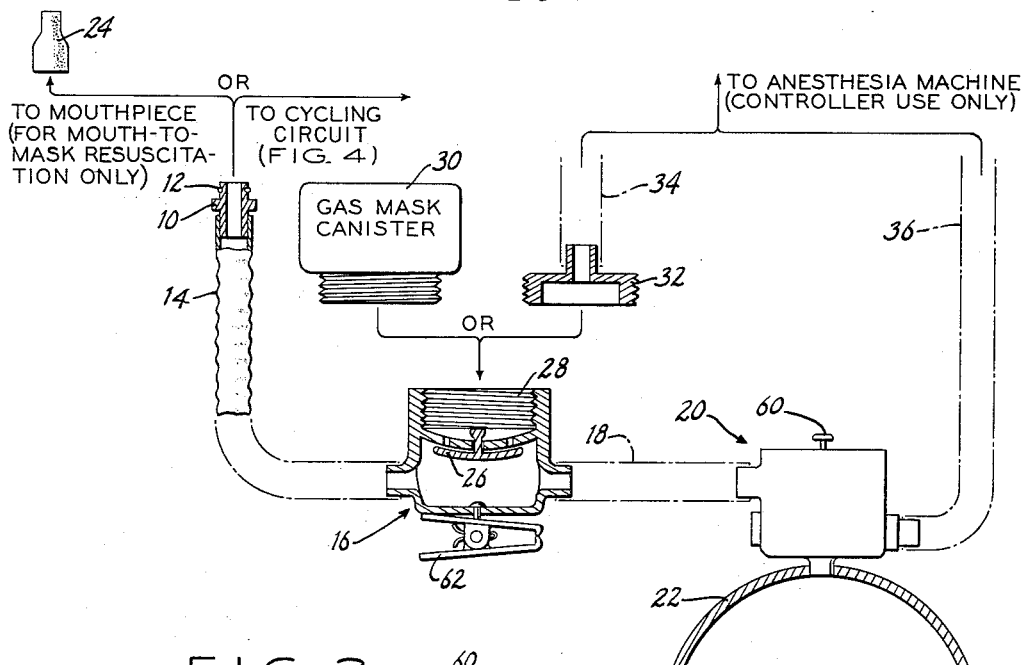
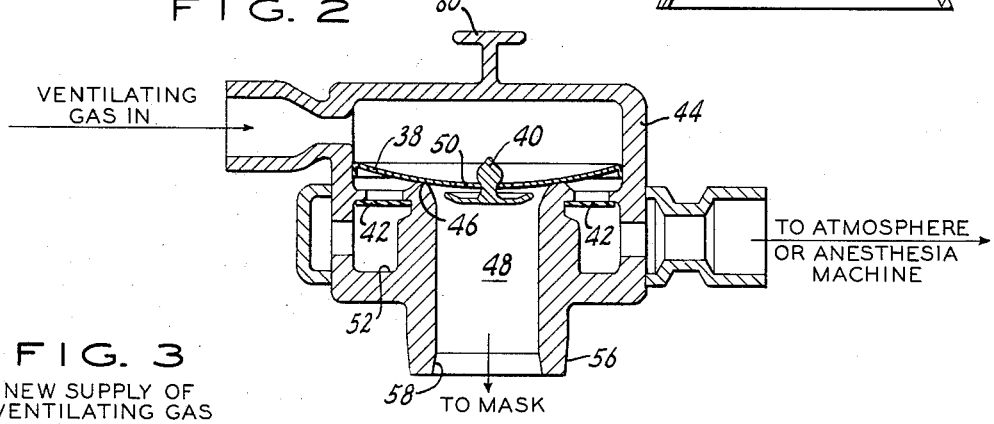
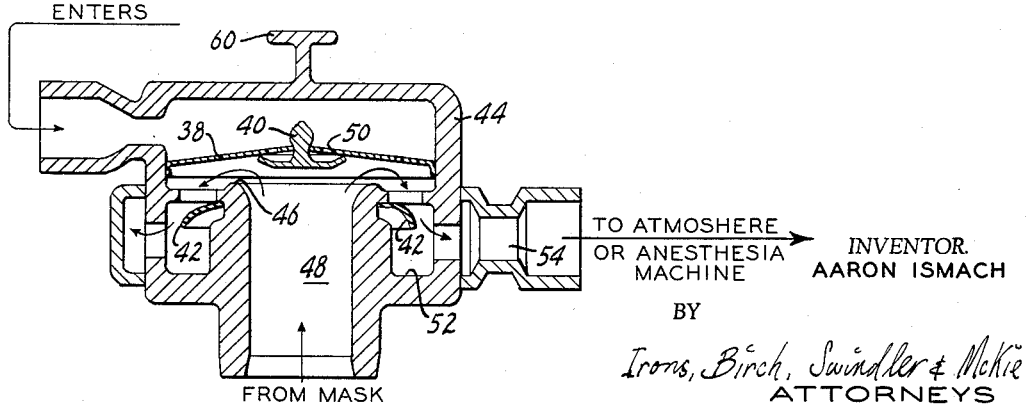
INVENTOR.
AARON ISMACH
BY
Irons, Birch, Swindler & McKie
ATTORNEYS May 17, 1966　　　　A. ISMACH　　　　3,251,359
AUTOMATIC INTERMITTENT POSITIVE PRESSURE VENTILATORS
Filed April 25, 1963　　　　　　　　　　　　　3 Sheets-Sheet 2
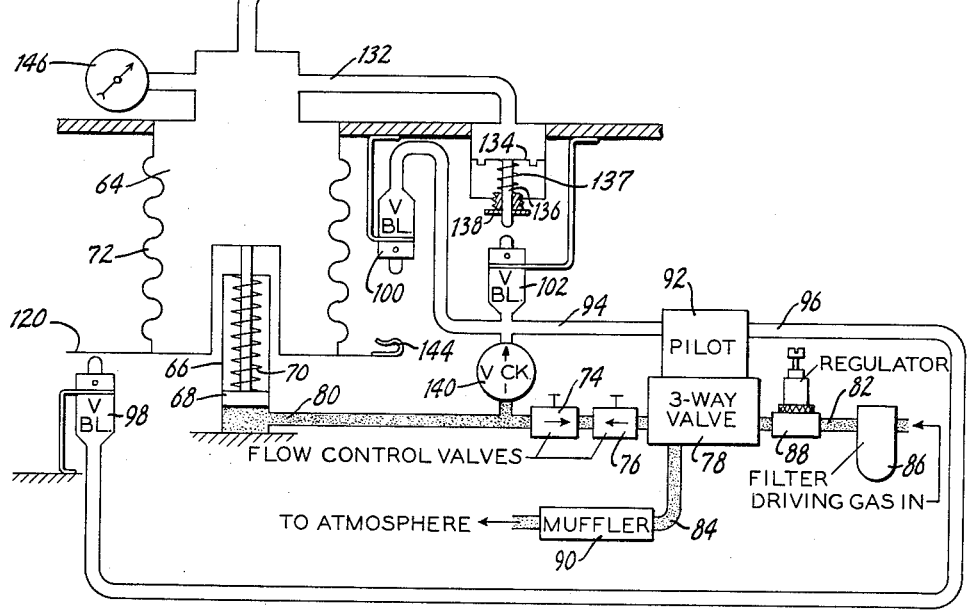
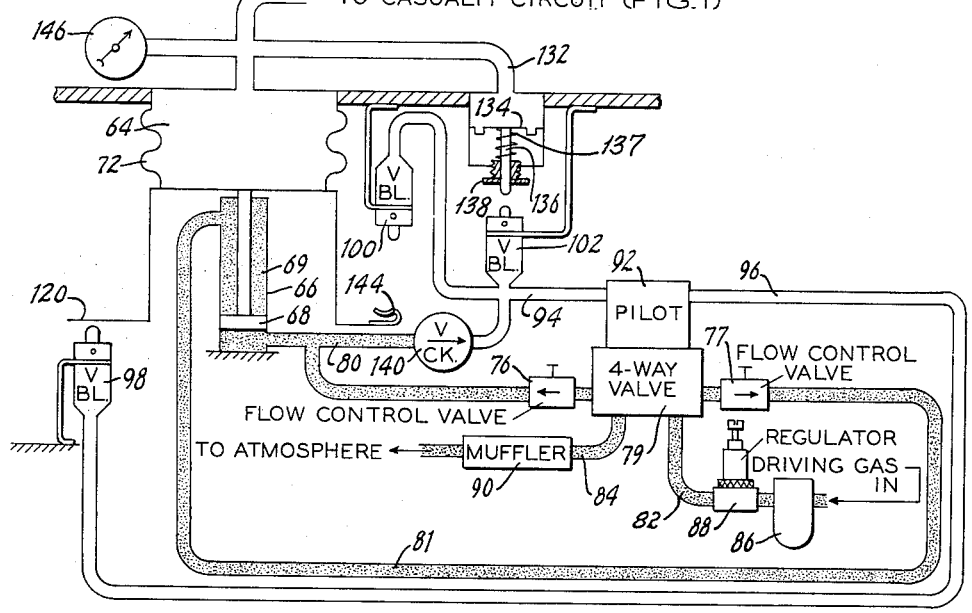
INVENTOR.
AARON ISMACH
BY
*Irons, Birch, Swindler & McKie*
ATTORNEYS May 17, 1966  A. ISMACH  3,251,359
AUTOMATIC INTERMITTENT POSITIVE PRESSURE VENTILATORS
Filed April 25, 1963  3 Sheets-Sheet 3

INVENTOR.
AARON ISMACH
BY
Irons, Birch, Swindler & McKie
ATTORNEYS

United States Patent Office 3,251,359
Patented May 17, 1966

3,251,359
AUTOMATIC INTERMITTENT POSITIVE
PRESSURE VENTILATORS
Aaron Ismach, 2820 Ocean Parkway, Brooklyn, N.Y.
Filed Apr. 25, 1963, Ser. No. 275,551
16 Claims. (Cl. 128—29)

The present invention relates to medical ventilators and more particularly to intermittent positive pressure ventilators that automatically provide both safe and effective ventilation for a large range of respiratory casualties.

This invention provides a novel combination of components, preferably pneumatic, which, with preset operating parameters, yields a device suitable for use as an emergency resuscitator and, with adjustable controls, yields a ventilation controller suitable for use by an anesthetist in combination with an anesthesia machine.

Although as embodied, the instant invention provides a portable automatic resuscitator for emergency use in ambulances, rescue vehicles, and the like and for emergency use in the field by rescue squads or military medical teams in either a contaminated or a noncontaminated atmosphere, it is extremely versatile and in addition to its primary use as an emergency resuscitator, it can also be used as an anesthesia controller or as an infant ventilator. To simplify and clarify the explanation of the invention, the description that follows will, for the most part, be restricted to an embodiment of the invention as an emergency type resuscitator. It will be apparent from the description, however, that with slight modifications that would be obvious to a person skilled in the art, the invention is equally applicable to other types of ventilators.

It is thus an object of this invention to provide an automatic resuscitator that includes means for safely ventilating low impedance casualties with volume cycling but that also includes means for effectively ventilating high impedance casualties by pressure cycling once a critical pressure is reached.

It is another object of the instant invention to provide an automatic resuscitator which includes means that permit a relatively untrained operator to concentrate on the management of the casualty's air passageway, such as through proper positioning of the casualty, and thus its use makes it more likely that the output of the device on the casualty's airway will produce safe, effective ventilation. In furtherance of this object, the device of this invention allows the operator the free and full use of both hands for manipulating the casualty. No adjustment of the resuscitator by the operator is required throughout the entire procedure once the device is placed in operation.

Another object of the present invention is to provide a resuscitator or ventilator that can be safely and effectively used by military or rescue personnel to treat high impedance chemical warfare casualties, such as nerve gas victims, in a contaminated atmosphere, but which will still have the capability of providing for general medical resuscitation in more conventional situations.

Another object of the present invention is to provide a resuscitator that does not require a physiologic compressed gas for operation, since gases, such as medical oxygen, would not be available in sufficient quantity in the field in the event of a chemical warfare attack or similar mass casualty situation.

Another object of the present invention is to provide a resuscitator that employs separate circuits for ventilating gas and for driving fluid. Divorcement of the ventilating gas circuit from the driving fluid circuit achieves a unit that is not fatal to the casualty should a driving fluid failure occur, that is, the casualty will be able to breathe whether or not the resuscitator cycles.

Another object of the present invention is to provide a resuscitator in which the condition of the casualty or patient can be determined and monitored both by a pressure gauge in the casualty circuit and by visual and audible siganls including movement of the ventilating gas reservoir or bellows in the cycling circuit.

Another object of the instant invention is to provide a resuscitator in which ventilating gas may be fed to the casualty through a non-breathing valve means.

A further object of the present invention is to provide an audible signal, when the resuscitator is used on a tight (high impedance) casualty thereby alerting the operator that the casualty may need further medical attention. The device of this invention also provides an audible signal when the casualty has an airway obstruction and is not being properly ventilated; in this manner the operator is alerted that the patient's airway must be cleared before proper ventilation can proceed.

Another object of the present invention is to provide a resuscitator or ventilator in which the casualty circuit can be quickly disconnected from the cycling circuit and used separately as a highly efficient mouth-to-mask resuscitator, if failure of the cycling circuit or loss of driving gas occurs.

A further object of the instant invention is to provide an intermittent positive pressure device that is relatively simple to construct and maintain and which produces a minimum average (or mean) pressure at the mask per unit of lung ventilation for any given casualty impedance thereby minimizing the load on the casualty's heart.

Another object of the present invention is to provide a resuscitator or ventilator which requires only a compressed gas source for operation. Elimination of electrical components permits safe use of the ventilators of this invention in explosive atmospheres or hospital operating rooms. Operation from compressed gas sources permits the ventilators of this invention to obtain their operating power from air brake systems of vehicles, from exhaust gases, from an air pump connected to the spark plug port of an internal combustion engine, from tanked or compressed gases, and when available, from electrically or gasoline driven air compressors.

Another object of the instant invention is to provide a resuscitator or ventilator that requires a minimum amount of driving gas so that a relatively long running time can be obtained from a small tank of compressed gas.

A further object of the present invention is to provide a ventilator that can be employed as an automatic anesthesia controller having operating parameters that can be easily set by trained anesthetist or anesthesiologist. The ventilators of this invention can also be used as safe and effective infant ventilators.

A still further object of this invention is to provide a resuscitator or ventilator that uses commercially available, off the shelf, and relatively inexpensive pneumatic valves and components so that it can be produced economically in large quantities and requires relatively simple stocking of spare parts to insure adequate maintenance and repair.

Unlike most commercial ventilators, the ventilators of the instant invention automatically provide both safe and effective ventilation for both low and high impedance casualties. Commercial ventilators are divided into two main categories: (1) pressure cycled devices, and (2) volume cycled devices. The pressure cycled devices are safe on low impedance casualties but are ineffective on high impedance casualties. The volume cycled devices, on the other hand, are effective ventilators for both low and high impedance casualties, but volume cycled devices can be unsafe on high impedance casualties, when they generate excessive pressures.

The ventilators of the present invention combine the advantages of both the pressure cycled devices and the volume cycled devices and at the same time eliminate the disadvantages attendant on both types of devices. The devices of this invention thus normally operate as constant volume devices, but they automatically switch into pressure cycling, when pressure cycling is required because of high casualty impedance. Casualties of low or medium impedance that do not require pressure cycling are automatically volume cycled by the ventilators of the instant invention.

When a high impedance casualty, such as one exposed to chemical warfare agents, e.g., nerve gas, is ventilated, it has been found experimentally that conventional pressure cycled resuscitators of the type approved for use on humans, consistently fail to produce a sufficient pressure gradient to achieve effective lung ventilation following the acute bronchial constriction and loss of compliance of the lungs and chest associated with such a nerve gas casualty, since none of the pressure cycled resuscitators are permitted by their design to develop pressures exceeding 45 cm. $H_2O$ pressure, which is an inadequate pressure, which is an inadequate pressure for effective ventilation on a high impedance casualty.

Attempts to increase the cycling pressure of commercial pressure cycled resuscitators to effective values make them unsafe on low impedance casualties, since sustained high alveolar pressure may be imposed on the lungs and lead to serious injury. With such high pressure devices, an improper setting by the operator could be fatal. Also, for optimum ventilation the cycling pressure setting must be constantly readjusted during resuscitation, as the impedance of the casualty decreases.

On the other hand, apparatus designed to produce a constant tidal volume, that is, a fixed stroke volume pump which delivers a given amount of ventilating gas into the lung at each cycle regardless of the impedance offered to the flow of gas, has been shown to provide adequate alveolar ventilation to obtain survival rates of 95% or greater on high impedance casualties. Since there is nothing in the volume cycled devices, however, to limit the pressure that may be built up on the casualty, if the volume of the ventilated lung decreases, volume cycled devices cannot be considered truly safe.

Attempts to ameliorate this condition by adding a pressure relief valve to the volume cycled devices so that excessive ventilating gas pressure is vented to the atmosphere, have resulted in reducing the effectiveness of the devices, because the opening of the relief valve reduces the volume of ventilating gas going to the casualty at the time that ventilation is needed most. Further, the setting of such a pressure relief valve is critical and requires repeated readjustment by the operator as the casualty impedance changes during resuscitation. By this compromise, effectiveness of the volume cycled devices is sacrificed for safety.

An interesting variation of the pressure cycled unit, that appears to offer some of the features of the volume cycled device, is one that employs a pressure cycling device to actuate a bellows within a sealed container. The bellows is connected to the casualty and acts as a buffer so that if the device is properly matched to the casualty, safe and effective ventilation may be attained. In such a device, the pressure cycling unit causes a high and low pressure to be generated within the bellows container to cause contraction and extension of the bellows, thereby ventilating the casualty. The pressure required to contract the bellows is a function of the casualty impedance to ventilation, the higher the impedance, the greater the pressure requirement. Usually a trained operator adjusts the high pressure setting for the particular casualty and makes repeated adjustments as needed during the ventilation procedure to effectively match the casualty and machine.

Theoretically, it may appear that such a device can be made to give safe and effective ventilation automatically to a wide range of casualties in a manner similar to the ventilators of this invention. In actual practice, however, this is not the case.

If one of these prior pressure cycling units is preset to cycle at a relatively high pressure, such as when 60 cm. $H_2O$ pressure is reached in the casualty circuit, the bellows will not start to extend until this pressure is reached. If the casualty offers a high impedance to ventilation, this pressure is attained before complete compression of the bellows occurs and the unit pressure cycles in an acceptable manner, since the driving unit is a pressure cycled device. However, if the casualty offers a low impedance to ventilation, the pressure required to cause cycling can only be attained after the bellows has been completely contracted. Then, and only then, can the driving gas build up pressure within the container to actuate the cycling mechanism. Since the bellows container is fairly large, and the input flow of driving gas is controlled at a relatively slow rate, an appreciable time delay occurs after the bellows stops moving and the cycling mechanism causes the bellows to start extending. A synthetic constant volume mode of operation may result, but the pressure cycling device introduces an undesirable time delay. During this delay, the casualty is not being ventilated, is being prevented from exhaling, and is being maintained under pressure needlessly, which results in medically unacceptable ventilation.

Since the concept of a completely automatic ventilator, such as the automatic ventilators of this invention, requires that the unit have a pressure reserve for high impedance casualties, without sacrificing its effectiveness for low impedance casualties, the pressure cycled type of ventilator that uses a bellows sealed in a container is not suitable as an effective, completely automatic device which can be used by relatively untrained personnel. Such a unit is usually fairly large, is unwieldy for emergency resuscitation in the field, and is basically designed for use in a hospital by highly trained individuals within the operating or recovery rooms.

In summary, commercial resuscitators and ventilators are either safe or effective, but are not both safe and effective over the entire range of respiratory casualties, and since they require repeated resetting of controls during resuscitation, they demand a skilled operator. The instant invention, however, provides a resuscitator that is simultaneously both safe and effective, that is automatic in operation, and that can be operated by a relatively unskilled operator. The resuscitators and ventilators of this invention also free both of the oeprator's hands for positioning of the casualty and enable him to maintain a good mask seal on the casualty's face. It has been found in the past, that even if the operator is highly skilled, the chances of the casualty's survival are much better, when the operator has both hands free, than they are, when he must devote the use of one hand to manipulation of the resuscitator or ventilator controls.

Broadly described, the ventilator of the present invention comprises a ventilating gas supply conduit for conducting ventilating gas to an inhalating patient including a variable volume ventilating gas reservoir, a ventilating gas supply port for supplying ventilating gas to the ventilating gas supply conduit, means for alternately expanding and contracting the volume of the ventilating gas reservoir, check valve means for opening the ventilating gas supply port responsive to expansion of the ventilating gas reservoir and for closing the ventilating gas supply port responsive to contraction of the ventilating gas reservoir, and a non-rebreathing valve means for exhausting exhaled gas away from the patient. The ventilators of this invention also, and perhaps most important, include a first limit means for volumetrically limiting the expansion of the ventilating gas reservoir, means for causing contraction to commence without significant time delay when the volumetric limit on expansion is reached a second limit means for volumetrically limiting the contraction of the ventilating gas reservoir, means for causing expansion to commence without significant time delay when the volumetric limit on contraction is reached, and a pressure-responsive means having a variable setting for limiting the maximum pressure of the ventilating gas to a preset value by preventing further contraction of the ventilating gas reservoir and causing its expansion to commence once the preset pressure value is reached, whereby the ventilator acts as a constant volume ventilator until the preset pressure is reached and then acts as a pressure cycled ventilator cycling at the preset maximum pressure until the pressure drops below the preset value, when it again acts as a constant volume ventilator.

In accordance with the invention, when the preset value of maximum pressure is reached, the ventilator is automatically switched by the pressure-responsive means and a control means actuated by response of the pressure-responsive means from volume-cycling with a constant stroke-volume that supplies a constant amount of ventilating gas to the patient per time interval with a reserve of pressure to automatically compensate for changes in patient impedance, to pressure-cycling with a variable stroke-volume in which stroke-frequency increases proportionately with decrease of stroke-volume to effectively maintain substantially the same amount of ventilating gas per time interval to the patient as when the device is cycling as a constant stroke-volume device. The pressure-responsive means safely limits the maximum pressure generated by the device, and continues to cause the device to pressure-cycle with a variable stroke-volume until patient impedance decreases to a value at which less than the preset maximum pressure is generated and the device automatically resumes cycling with a constant stroke-volume.

Additional objects and advantages of the invention will be set forth in the description which follows and in part will be obvious from the description, or may be learned by practice of the invention, the objects and advantages being realized and attained by means of the instrumentalities and combinations particularly pointed out in the appended claims.

The invention consists in the novel parts, constructions, arrangements, combinations, and improvements shown and described.

The accompanying drawings which are incorporated in and constitute a part of this specification, illustrate one embodiment of the invention and together with this description, serve to explain the principles of the invention.

Of the drawings:

FIG. 1 is a partially schematic diagram of the casualty circuit showing certain of the parts in section for clarity;

FIG. 2 is a central vertical section of the double acting valve on the face mask and shows it in one of its operating positions;

FIG. 3 is a central vertical section of the double acting valve of FIG. 2 and shows it in its other operating position;

FIG. 4 is a partially schematic drawing of the cycling circuit;

FIG. 5 is a schematic drawing of an alternate or second embodiment of the cycling circuit;

Figure 6:
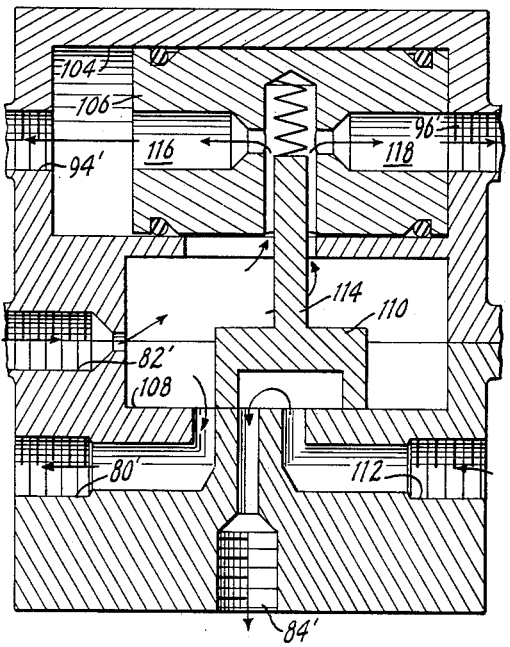
FIG. 6 is a central vertical section of the four-way valve of FIG. 5 and shows the valve in one of its two operating positions.

It is to be understood that both the foregoing general description and the following detailed description are exemplary and explanatory, but are not restrictive of the invention.

Reference will now be made in detail to the present preferred embodiment of the invention, an example of which is illustrated in the accompanying drawings.

In accordance with the invention, the ventilator includes a casualty circuit illustrated in FIG. 1. The casualty circuit includes a ventilating gas supply conduit comprising a connector means 10, with an O-seal means 12, a long hose 14, an inlet valve assembly 16, a short hose 18, a double acting valve means 20, and an oro-nasal face mask 22, as shown in FIG. 1. An auxiliary mouthpiece 24 can be slipped over the connector means 10, so that mouth-to-mask resuscitation can be manually administered by the operator, who by placing his mouth on the mouthpiece 24 may then draw in and push out air from the atmosphere for administration to the casualty using his own lungs as the power source. The O-seal means 12 permits an airtight connection to be made to the mouthpiece 24 or to the cycling circuit of the ventilator which is described in detail below.

In accordance with the invention, means are provided to permit air to be drawn into the casualty circuit through the inlet valve assembly 16 and, at the same time, to prevent air from exhausting through the inlet valve assembly 16. As embodied, this means comprises an inlet check valve 26. The inlet valve assembly 16 also includes a screw fitting 28 having screw threads that will accommodate a standard gas mask canister 30 or an anesthesia fitting 32. The gas mask canister 30 may be employed, when ventilation is to be given to a patient in a contaminated atmosphere, and the anesthesia fitting 32 permits the ventilator to be connected to an anesthesia machine, when it is desired to use the ventilator as an anesthesia controller. A portion of an anesthesia machine outlet hose 34 is schematically represented by phantom lines showing how the hose is connected to the anesthesia machine fitting, and an anesthesia machine inlet hose 36, also represented by phantom lines, connects the exhaust from a double acting valve means 20 to the anesthesia machine.

In accordance with the invention, a double acting valve means 20 is provided that admits air into the oral-nasal mask 22 only via the short hose 18, and that also permits air exhaled by the casualty or patient to exhaust directly to the atmosphere but allows no exhaled air to flow back into the short hose 18. The double acting valve means 20 comprises essentially, as shown in FIGS. 2 and 3, three flexible valves: an inlet valve 38, an inlet check valve 40, and an exhaust valve 42. These valves are all contained in a rigid housing 44. In FIG. 2, the double acting valve means 20 is shown in the inhale position with the orifices 50 of the inlet valve 38 open, although it must be noted that the inlet valve 38 also acts as a check valve, when in the inhale position of FIG. 2, and seals the exhaust line from the oro-nasal mask 22. This is accomplished when the inlet valve 38 seats itself against an annular shoulder 46 in the main air channel 48 of the double acting valve means 20.

In FIG. 3, the double acting valve means 20 is shown in the exhale position, in which the inlet check valve 40 seals the orifices 50 in the inlet valve 38 and the inlet valve 38 is pushed off its seat from the annular shoulder 46 by the pressure of the exhaled air, which in turn also acts to open the flapper exhaust valve 42. The flapper exhaust valve 42, also acts, when the double acting valve means 20 is in the inhale position, to seal the oro-nasal mask 22 and the main air chamber 48 from the atmosphere, thus assuring nonentary of contaminated air, if the atmosphere should be contaminated. The exhaled air after passing the flapper exhaust valve 42 is admitted to collecting ring 52 surrounding the main air channel 48, and from collecting ring 52, the exhaled air is admitted to the exhaust channel 54, from whence it is either exhausted to the atmosphere or carried through the anesthesia machine inlet hose 36 to the anesthesia machine.

The outlet of the main air channel 48 in the double acting valve means 20 is provided with an external taper 56 that will accommodate a standard medical oro-nasal mask 22, and is also provided with an internal taper 58 that will accommodate a standard medical endotracheal catheter, so that a catheter may be used with a casualty circuit if such use is indicated by the casualty condition. A stud 60 is also provided on the housing of the double acting valve means 20 to anchor a standard mask retainer, whereby the double acting valve means and mask assembly may be secured to a casualty's head for extended periods of resuscitation.

The inlet valve assembly 16 is provided with a spring clip 62 to permit attachment of this assembly to a casualty's clothing, approximately one handbreadth below the casualty's chin, for proper positioning of this element of the casualty circuit (FIG. 1).

In operation, when a new supply of air is drawn into the casualty circuit by the ventilating gas reservoir in the cycling circuit, or by the lung power of the operator in mouth-to-mask resuscitation, the inlet valve 26 in the inlet valve assembly 16 opens to permit free entrance of air from the atmosphere or through a gas mask canister 30, if the atmosphere is contaminated. If the unit is being used as an anesthesia controller, the anesthesia machine output is connected to the inlet valve assembly 16 via the anesthesia fitting 32 and the outlet hose 34 of the anesthesia machine. This arrangement permits the ventilating gas reservoir to fill with a given mixture of anesthesia gases, and at the same time, allows the casualty's lungs to release the supply of ventilating gas that had just previously been forced into them. When the casualty exhales, the valves 38, 40, 42 in the double acting valve means 20 assume the position shown in FIG. 3. Inlet valve 38 and inlet check valve 40 seal off the inlet port while exhaust valve 42 opens the casualty to the collector ring 52, and the collector ring 52, as previously described, is fitted with the exhaust tube 54 to which the inlet hose 36 of the anesthesia machine may be connected to complete the controller circuit (see FIGS. 1 and 3).

The double acting valve means 20, illustrated in detail in FIGS. 2 and 3, is preferred for use in the casualty circuit, because it is a zero leakage valve and is, therefore, extremely suitable for use in contaminated atmospheres because there is no danger of leakage of contaminated air into the casualty, when such a double acting valve means is used. Other configurations of commercially available high quality double acting or non-rebreathing anesthesia valves could, however, be employed in its stead.

In accordance with the invention, means are provided for controlling the volume, pressure and rate of administration of ventilating gas being fed to the casualty circuit and in turn to the casualty himself. As embodied, this means comprises the cycling circuit or system that is shown partially schematically in FIG. 4. As shown in FIG. 4, the cycling circuit is provided with a variable volume ventilating gas reservoir 64 and means for alternately contracting and expanding the ventilating gas reservoir 64. As embodied, this latter means comprises a spring return actuating cylinder 66, which in turn comprises a gas type piston 68 and a return spring 70 mounted within the cylinder 66. A driving fluid, which may be any suitable gas under pressure, is used to raise the piston 68 in the cylinder 66 and thereby cause contraction of the ventilating gas reservoir 64 through the compression of the bellows 72. When driving gas pressure is released, the spring 70 within the cylinder 66 returns or lowers the piston 68, allowing the bellows 72 to extend and the ventilating gas reservoir 64 to expand.

In accordance with the invention means are provided for independently controlling the rate at which the driving gas enters and leaves the actuating cylinder 66, and the rate of expansion and contraction of the ventilating gas reservoir 64 is in turn controlled by the same means. As embodied, this means comprises two flow control valves 74 and 76, mounted back to back, as shown in FIG. 4. Each flow control valve 74, 76 permits free flow in one direction (designated by the arrows in FIG. 4), but allows only a controlled or variable restricted flow in the opposite direction. It is accordingly possible to control the rate at which the driving gas enters and leaves the actuating cylinder 66, and thereby also to control the rate of contraction and expansion of the ventilating gas reservoir 64 by adjusting each of the flow control valves 74, 76. Thus, adjustment of flow control valve 74 will control the rate at which driving gas enters actuating cylinder 66, or inspiration to the casualty, and adjustment of flow control valve 76 will adjust the rate at which the spring 70 forces driving gas out of the cylinder 66 during expiration of the casualty.

The cycling circuit includes a three-way valve 78. This is a two-position valve and alternately connects the actuating cylinder line 80 to either the driving gas supply line 82 or to the atmosphere through exhaust line 84. The three-way, two-position valve 78 thus determines the direction of movement of the bellows 72. When it is in the position interconnecting the driving gas supply line 82 with the actuating cylinder line 80, the bellows will be compressed and the ventilating gas reservoir 64 contracted. When the valve is in the other position and interconnecting the actuating cylinder line with the exhaust line 84, the bellows is free to extend, and the ventilating gas reservoir 64 expands.

The driving gas supply line 82 includes a filter 86 and a pressure regulator 88. The filter 86 cleans the driving gas to reduce wear, corrosion and gumming of the valves. Also, water in the driving gas is trapped in the filter and automatically drained, and more surface damping is also furnished by the filter. The pressure regulator 88 is preset at a given pressure, such as 30 p.s.i., and permits the ventilator to be connected to a driving fluid source of greater pressure but still to operate in accordance with established parameters. The atmospheric or exhaust line 84 is provided with a sound muffler 90 to reduce the noise intensity of the exhaust driving gas.

The three-way, two-position valve 78 is actuated by a pilot 92 that is physically located within the upper section of the three-way valve housing. The pilot 92 has two lines 94, 96. Line 96 is connected to bleeder valve 98, while line 94 is connected to bleeder valves 100 and 102.

Figure 7:
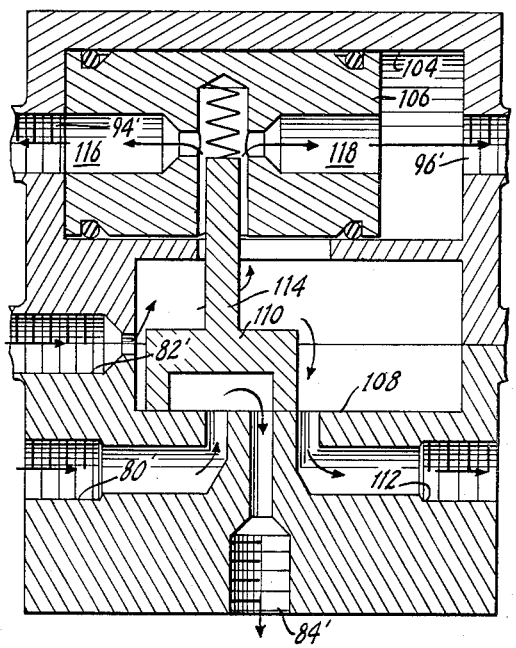
FIG. 7 is a central vertical section of the valve of FIG. 6 showing the valve in its other operating position.

Although they form no part of this invention per se, the pilot 92 and three-way valve 78 are illustrated in detail in FIGS. 6 and 7, and reference will be made to FIGS. 6 and 7 to illustrate the operation of the pilot 92 and three-way valve 78. As shown in FIGS. 6 and 7, pilot port 94' is connected to line 94 and pilot port 96' is connected to line 96. Also as shown in FIGS. 6 and 7, driving gas supply line port 82' is connected to driving gas supply line 82, actuating cylinder line port 80' is connected to actuating cylinder line 80, and exhaust line port 84' is connected to the exhaust line 84. Finally, as shown in FIGS. 6 and 7, pilot 92 and three-way valve 78 include a pilot chamber 104 in which a pilot piston 106 reciprocates, a main chamber 108 and a spring loaded stem valve 110 that reciprocates in the main chamber 108 responsive to the reciprocation of the pilot piston 106 in the pilot chamber 104. The direction of driving gas flow in FIGS. 6 and 7 is represented by arrows.

Valve illustrated in FIGS. 6 and 7 is actually a four-way valve, valve port 112 is plugged or blocked so that the valve 78 operates as a three-way valve. As shown in FIG. 6, the three-way valve 78 is in a position to allow driving gas to enter the cylinder 66 to cause contraction of the ventilating gas reservoir 64. It will be noted that driving gas, in FIG. 6, flows around the stem 114 of the spring loaded stem valve 110 and through pilot piston ports 116, 118 to equalize the pressure in the two pilot lines 94, 96 (see FIG. 4). It will also be noted, that the pilot piston 106 is in its extreme right hand position and that the spring loaded stem valve 110 is moved to a position that interconnects port 82' with port 80', thereby also interconnecting driving gas supply line 82 with actuating cylinder line 80 (see FIG. 4).

In FIG. 7, the three-way valve 78 is shown in its other position. It will be noted that in this position the pilot piston 106 is in its extreme left hand position and the spring loaded stem valve 110 has moved into a position that now interconnects port 80' with port 84', thereby interconnecting actuating cylinder line 80 with exhaust line 84. When in the position shown in FIG. 7, the three-way valve thus permits the driving gas previously trapped in the actuating cylinder 66 to flow through the actuating cylinder line 80 and into the exhaust line 84 where it exhausts to the atmosphere, thus permitting the ventilating gas reservoir 64 to expand.

In accordance with the invention, the bellows 72 of the ventilating gas reservoir 64 is provided with an end plate 120, and this end plate 120, as may be seen in FIG. 4, strikes either bleeder valve 98 or bleeder valve 100 at the extreme of each stroke of the bellows 72 and piston 68. When the button on bleeder valve 98 is depressed, pilot line 96 is then opened to the atmosphere and the release in pressure on pilot 82 causes pilot piston 106 (FIG. 6) to move to the extreme right hand position shown in FIG. 6 causing an alignment of the spring loaded stem valve 110 that connects driving gas supply line 82 with actuating cylinder line 80 and that allows the driving gas to push piston 68 and bellows 72 upward contracting the ventilating gas reservoir 64.

When the button on bleeder valve 100 is actuated by the bellows end plate 120, a similar sequence of events occurs. The driving gas pressure in line 94 is released and pilot piston 106, as shown in FIG. 7, is moved to its extreme left hand position causing actuating cylinder line 80 to be connected to exhaust line 84 and permitting piston 68 and bellows 72 to move downward and expand the ventilating gas reservoir. The response to the actuation of the bleeder valves 98 and 100 is very rapid, and there is no appreciable time delay in the resulting response of the bellows 72 to such actuation. Accordingly, when the desired volumetric limit of the bellows 72 is reached on expansion, contraction is caused to commence without significant time delay, and when the desired volumetric limit is reached on contraction, expansion is also caused to commence without significant time delay.

In accordance with the invention, the stroke of the bellows 72 or the differential volume of the ventilating gas reservoir 64 can be varied by merely changing the physical location of either bleeder valve 98 or bleeder valve 100 within the limits of the stroke of the actuating cylinder piston 68.

Figure 8:
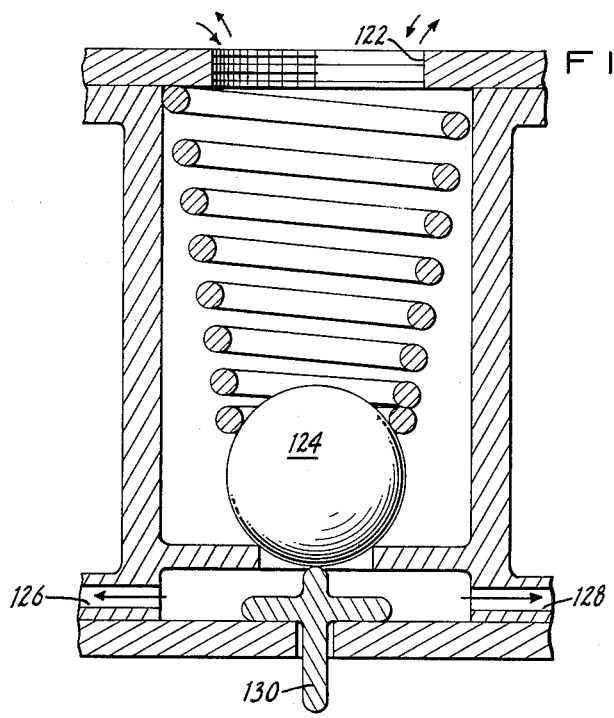
FIG. 8 is a central vertical section of a bleeder valve that may be used in the cycling circuits shown in FIGS. 4 and 5.

A typical bleeder valve, forming no part of this invention, is illustrated in FIG. 8. This bleeder valve could represent any of the three bleeder valves 98, 100 and 102 (FIG. 4), as they may all be of the same construction. As shown in FIG. 8, the bleeder valve port 122 is connected either to pilot line 94 or pilot line 96 (FIG. 4), and the bleeder valve is normally sealed by the spring loaded ball check valve 124. The bleeder valve is also provided with atmospheric ports 126, 128 and actuating button 130. When, for example, the bellows end plate 120 (FIG. 4) strikes the bleeder valve actuating button 130 (FIG. 8), depression of this button unseats the ball check valve 124 and allows the driving gas to pass freely to the atmosphere through ports 126, 128.

In accordance with the invention, means are provided so that if casualty impedance builds up to cause a large pressure to be built up in the casualty circuit, the cycling circuit will automatically switch from volume cycling (normal cycling) to pressure cycling. As embodied, this means, in addition to means previously described, includes a pressure tap line 132 on the ventilating gas reservoir 64 that is connected to a spring biased diaphragm 134 which in turn is provided with an actuator 136, an actuator 136 is directly opposed to the actuating button 130 of bleeder valve 102.

In operation, bellows 72 can be started on its downward motion by actuation of either bleeder valve 100 or bleeder valve 102. When casualty impedance is such that ventilation can be accomplished below a predetermined or preset pressure setting such as 60 cm. $H_2O$, the bellows 72 and in turn the ventilating gas reservior 64 is volume cycled between bleeder valves 98 and 100. However, if there is a greater casualty impedance, that causes a large pressure to be built up in the casualty circuit, the pressure being exerted through line 132 will cause diaphragm 134 to expand downward and cause actuator 136 to actuate bleeder valve 102.

This actuation of bleeder valve 102 through sensing of casualty circuit pressure causes a shorter stroke in the ventilating gas reservoir 64 with more strokes per unit time, or, in other words, causes pressure cycling to commence and continue until casualty impedance once again drops to a value low enough to permit the unit to return to volume cycling. The predetermined or preset pressure for changing the mode of operation of the cycling circuit from volume cycling to pressure cycling is adjustable by means of adjusting screw 138 which controls the amount of bias on spring 137.

In accordance with the invention, means are provided to achieve a rapid pressure drop in the casualty circuit at the beginning of exhalation to allow the casualty to have unimpeded passive expiration. As embodied, and as shown in FIG. 4, the means for achieving the desired rapid pressure drop at the beginning of expiration comprises a quick discharge check valve 140 connecting the actuating cylinder line 80 with pilot line 94 and bleeder valves 100 and 102. The quick discharge check valve 140 permits an instantaneous drop in pressure in the line 142 to the casualty circuit once bellows 72 completes its upward motion. This pressure drop-off in a casualty line causes a rapid shifting of the components of the double acting valve 20 from the position shown in FIG. 2 to that shown in FIG. 3 thereby permitting the casualty to have unimpeded passive expiration.

In operation, when either bleeder valve 100 or 102 is actuated, the pressure in pilot line 94 immediately drops and thereby allows a small quantity of driving gas to rapidly leave the actuating cylinder 66 through quick discharge check valve 140. This rapid withdrawal of driving gas from the cylinder 66 permits a rapid downward movement of bellows 72 to take place over a small portion of its down stroke, that is, while either bleeder valve 100 or 102 is open, and this quick downstroke in turn causes a rapid pressure drop in the casualty line 142 and casualty circuit.

Once bleeder valve 100 or 102 closes, pressure in the pilot line 84 builds up effectively and seals quick discharge check valve 140 during the remainder of the cycle. In practice, it has been found that bleeder valve 100 does not remain open long enough for the desired pressure drop to occur in the casualty circuit, if a solid striking tab is used to actuate the bleeder valve plunger. Accordingly, and in accordance with the invention, a leaf spring striker 144 is mounted on the bellows end plate 120 "to wipe" the plunger of bleeder valve 100 and hold bleeder valve 100 open for a brief moment after bellows 72 starts to extend. The leaf spring striker 144 thus provides a mechanical time delay and effectively increases the open time of bleeder valve 100. The amount of time delay thus attained is a function of the physical dimensions and spring constant of the leaf spring.

It will be noted that only bleeder valve 100 is provided with the leaf spring striker 144. This is by deliberate intent, since the double acting valve (FIG. 1) in the casualty circuit resonates loudly, due to oscillations of the flexible valves 38, 40, 42, if the pressure drop-off is not instantaneous. On volume cycling (bleeder valve 100 actuated), the rapid drop-off occurs and the noise level due to resonance of double acting valve 20 is low. However, on pressure cycling (bleeder valve 102 actuated), an incomplete pressure drop-off occurs and the double acting valve 20 resonates, producing a groaning like sound the intensity of which increases as casualty impedance increases. In accordance with the invention, and additional audible signal is thus provided for the operator, when the cycling circuit switches to pressure cycling, and the operator is warned that the casualty is extremely impeded and may require further medical attention, such as the use of an oropharyngeal airway or intubation. If the casualty's airway is totally obstructed, the rapid pressure cycling of the unit produces a distinctive rapid cycling sound which serves as a definite obstruction signal.

It will be noted from the above description that the impedance offered by a casualty determines the pressure that is required to effect a given amount of ventilation: the higher the casualty impedance, the higher the pressure required to effect ventilation. Until the pressure setting of the spring biased diaphragm 134 is reached, the ventilator of this invention acts as a volume cycled device; it delivers a fixed amount of ventilating air to the casualty in a given time, and builds up only enough pressure in the casualty circuit to overcome the impedance offered by the casualty. The ventilator of this invention thus offers a reserve of pressure up to a predetermined setting, but never builds up more than enough pressure to overcome the impedance of the casualty in the casualty circuit.

If casualty impedance should exceed the preset pressure on the diaphragm 134, the ventilator begins pressure cycling, and the stroke of the bellows 72 decreases. This reduction in stroke is accompanied by an increase in stroke rate, which tends to keep the amount of ventilation per unit time constant but the ventilation takes place at a higher mean mask pressure. In accordance with the invention, there is thus no reduction in the amount of ventilation delivered to the casualty at the time that the casualty is highly impeded and has the greatest need for ventilation. As ventilation takes effect and the impedance offered by the casualty decreases, the bellows 72 of the resuscitator automatically increases the length of its stroke and decreases its stroke rate until full excursion of bellows 72 occurs once more. Thereafter, only enough pressure will be built up in the casualty circuit to deliver a given volume of air into the casualty per stroke. A pressure gauge 146 is provided in the casualty circuit so that a direct pressure reading, as well as the movement of the bellows 72, can be used to give a visual indication of the casualty impedance and to monitor the condition of the casualty.

From the foregoing, it will be noted that with no adjustments of any type on the part of the operator, the resuscitator of this invention will automatically provide a predetermined amount of ventilation over a wide variety of conditions. For example, if the resuscitator is preset so that it operates in accordance with the parameters listed hereinafter in this specification, it can be removed from a chemical warfare gas casualty where it may have been required to maintain an alveolar ventilation of 14 liters per minute at a peak airway pressure of 60 cm. $H_2O$ pressure, and be placed upon a casualty in respiratory failure from a blow on the head or from narcotic overdose, and it will automatically continue to achieve the same alveolar ventilation but at a peak airway pressure of only 8 cm. $H_2O$ pressure.

Further, in accordance with this invention, the spring return actuating cylinder 66 is concentrically located within the bellows end plate 120, as shown in FIG. 4. The physical size of the cycling unit is thereby reduced, and only a small fraction of the ventilating gas reservoir 64 output is lost through the volume displaced by the actuating cylinder 66. Also in accordance with the invention, the spring return 70 is employed in the actuating cylinder 66 to conserve on driving gas; the use of the spring permits the driving gas source to be shut off during the entire expiration part of the ventilator cycle. Since the ratio of expiration to inspiration is usually maintained at about 2 to 1, driving gas is used during only one-third of the operating time of the ventilator, and this leads to a high gas economy in the ventilators of this invention.

The shape of the instantaneous flow trace into the casualty and the resulting pressure traces at the mask and in the lungs determine, to a large extent, the safety and effectiveness of ventilation. In general, the instantaneous flow rate should not exceed 0.8 liter per second in an adult, or coughing or choking may be induced. Similarly, the mean mask pressure must be maintained at a minimum for the reasons previously mentioned. The instantaneous flow trace is a function of the return spring 70 (FIG. 4), both as to its initial tension and spring constant, since the spring load as well as the casualty impedance must be overcome on the inspiratory stroke. The magnitude of the spring return in the actuating cylinder 66 should be carefully chosen to obtain desired instantaneous flow and pressure traces when operating into a wide variety of respiratory casualties.

As the return spring 70 compresses, it offers an increasing load to the pneumatic or fluid piston 68. This spring load is added to the load caused by patient impedance. The increasing load against which the piston must move causes the rate of piston travel and rate of responsive contraction of the ventilating gas reservoir 64 to decrease as the bellows 72 is compressed. The instantaneous ventilating gas flow rate from the reservoir 64 is thus higher at the start of bellows compression than at the end. It follows that the heavier the spring 70 for a given constant total travel time of the bellows in compression, the faster will be the initial travel of the bellows and the higher the initial instantaneous flow rate of ventilating gas.

In accordance with the invention, the lightest spring should be used that will cause the initial increased flow rate to positively actuate the valves 16 and 20 in the casualty circuit and guarantee that these valves will be positively sealed. It is important, however, that the spring must not be so heavy that it causes an initial flow rate high enough to induce coughing in the patient.

As previously stated, the quick discharge check valve 140, with the associated "wiper" leaf spring 144, are instrumental in producing an instantaneous rapid downward movement of the bellows 72 at the start of expiration to cause a negative peak of pressure to be induced at the input of the double acting valve 20 and cause it to shift rapidly into the position shown in FIG. 3, thereby permitting unimpeded passive expiration by the casualty and an appreciable reduction in mean mask pressure. In addition, regardless of the degree of casualty impedance, the practically instantaneous action of the bleeder valves causes, in turn, virtually instantaneous reversal of the ventilating gas reservoir from its contraction stroke to its expansion stroke and prevents the creation of any time period in which the casualty is held under pressure while not being ventilated. The mean mask pressure is also minimized by maintaining an inspiration to expiration ratio of 1 to 2 thereby maintaining pressure on the casualty only one-third of the time.

An important advantage of the ventilators of this invention is that it is not necessarily fatal if the driving gas supply should be lost during a resuscitation procedure. If the casualty is capable of spontaneous breathing, he can still breathe, with negligible added resistance, through the double acting valve 20 and the inlet valve 16 of the casualty circuit (FIG. 1), even if this circuit is connected to the cycling mechanism and the bellows 72 is not reciprocating. This feature of the present invention is in contrast to most other known resuscitators in which the driving gas is the ventilating gas, and loss of driving gas inactivates the valves making breathing mechanically impossible in addition to cutting off the source of ventilating gas. Should such an emergency occur with the ventilator of the present invention, the casualty circuit can be quickly disconnected from the cycling circuit, and with mouthpiece 24 in place, the casualty circuit can be instantly placed into use as a mouth-to-mask resuscitator.

In accordance with the invention, the ventilator of this invention may, by minor modification, be constructed in an alternative embodiment so that it forms an ideal infant ventilator. The cycling circuit for such a ventilator is illustrated in FIG. 5, and in the description that follows, parts similar to the cycling circuit illustrated in FIG. 4 have been designated with the same reference numerals used in FIG. 4.

In infant ventilators, driving gas economy is not as important as increased sensitivity. Accordingly, in the cycling circuit of the infant ventilator illustrated in FIG. 5, a double acting cylinder 69 is substituted for the spring return actuating cylinder 66 of FIG. 4. Further, a four-way, two-position valve 79 is substituted for the three-way, two-position valve 78 of FIG. 4. Finally, a cylinder line 81 is connected to the fourth port in the four-way valve and a flow control valve 77 is placed in the line 81 in place of the flow control valve 74 of FIG. 4. The cylinder line 81 is connected to port 112 as shown in FIGS. 6 and 7. This is the same port 112 that is plugged or blocked in the three-way valve 78 of FIG. 4.

In the embodiment of FIG. 5 there are thus two flow control valves 76 and 77 located on each cylinder line 80 and 81 to control the rate at which the driving gas is pushed out of either port of the double acting cylinder 69, and hence the speed at which the bellows 72 is extended and compressed. When bleeder valve 98 is actuated the four-way valve takes position shown in FIG. 6, and when either bleeder valve 100 or 102 is actuated, the four-way valve takes position shown in FIG. 7.

In accordance with the invention, in this configuration of the cycling circuit, there is no spring load on the actuating cylinder to overcome and the entire resistance imposed on the unit is due to casualty resistance. Similarly, with this configuration of cycling circuit, a rigid type of hose, offering extremely low compliance, should be employed in the casualty circuit so as not to add to the lung compliance of the infant. Otherwise, the principle of operation of the alternative embodiment ventilator shown in FIG. 5 is similar to the previously described operation of the ventilator shown in FIG. 4.

When the ventilator of this invention is used as a resuscitator, all operating parameters are fixed by presetting and locking the controls. A typical setting of the ventilator for use as a resuscitator on adults would provide the following parameters:

Bellows volume, full stroke _____ 900 cc.
Frequency, full stroke _____ 16 cycles per minute.
Ratio of inspiration to expiration time _____ 1 to 2.
Pressure limit for constant volume of operation _____ 60 cm. H₂O.

When the ventilator of this invention is used as an anesthesia controller, the settings may be made at the discretion of the anesthetist. When so used, the flow control valves 74, 76 may be ganged together so that it is possible to maintain a fixed inspiration to expiration ratio while the stroke rate is varied. Bleeder valve 98 may be mounted on a rack and pinion to permit easy movement of this valve and thereby control the extension of the bellows 72 and thereby the output of ventilating gas reservoir 64 to any desired value up to 1.5 liters.

When the unit is used as an infant ventilator, typical operation would be to have a variable bellows output of from 10 to 200 cc. and a cycle frequency adjustable from 20 to 60 cycles per minute, while maintaining an inspiration to expiration ratio of 1.0±0.2 to 2.0±0.2.

The invention in its broader aspects is not limited to the specific mechanisms shown and described, but also includes within the scope of the accompanying claims any departures made from such mechanisms which do not depart from the principles of the invention and which do not sacrifice its chief advantages.

What is claimed is:
1. A mechanical ventilator comprising:
 (a) a ventilating gas supply conduit for conducting ventilating gas to an inhalating patient including a variable volume ventilating gas reservoir;
 (b) a ventilating gas supply port for supplying ventilating gas to the ventilating gas supply conduit;
 (c) means for expanding the volume of the ventilating gas reservoir;
 (d) a source of driving fluid under pressure, the fluid being isolated from the ventilating gas;
 (e) means for contracting the volume of the ventilating gas reservoir responsive to driving fluid pressure;
 (f) check valve means for opening the ventilating gas supply port responsive to expansion of the ventilating gas reservoir and for closing the ventilating gas supply port responsive to contraction of the ventilating gas reservoir;
 (g) a non-rebreathing valve means for exhausting exhaled gas away from the patient;
 (h) a first limit means for volumetrically limiting expansion of the ventilating gas reservoir, a second limit means for volumetrically limiting the contraction of the ventilating gas reservoir; and means for causing expansion to commence without significant time delay when the volumetric limit on contraction is reached;
 (i) adjustable pressure-responsive means responsive to and actuated by ventilating gas pressure in the ventilating gas supply conduit, the pressure-responsive means having a variable setting that can be preset to respond when a predetermined maximum ventilating gas pressure value builds up in the ventilating gas supply conduit caused by increasing impedance in the patient;
 (j) a third limit means actuated by response of the pressure-responsive means to limit further contraction of the ventilating gas reservoir before the volumetric limit on contraction imposed by the second limit means is reached; and
 (k) control means responsive to actuation of the third limit means, the control means, when actuated, releasing driving fluid pressure from the means for contracting the ventilating gas reservoir, thereby causing expansion of the ventilating gas reservoir to immediately commence;
 (l) whereby the ventilating gas reservoir cycles with a constant stroke-volume and supplies a constant amount of ventilating gas to the patient over a given time interval until the predetermined maximum pressure value is reached responsive to increasing impedance in the patient, when the reservoir, upon response of the pressure-responsive means and actuation of the third limit means and control means, automatically pressure-cycles with a variable stroke-volume in which the stroke-frequency increases proportionately with decrease of stroke-volume to effectively maintain substantially the same constant amount of ventilating gas over a given time interval to the patient, but at a safey limited maximum pressure, until patient impedance decreases sufficiently to cause ventilating gas pressure in the ventilating gas supply conduit to remain below the predetermined maximum pressure value, and the reservoir automatically resumes cycling with a constant stroke-volume.

2. The invention defined in claim 1, in which the variable volume ventilating gas reservoir comprises a bellows in which the means for alternately expanding and contracting the volume of the ventilating gas reservoir comprises a body having a chamber and a piston reciprocally mounted within the chamber, the piston being coupled to the bellows, means biasing the piston in a direction to cause extension of the bellows and expansion of the ventilating gas reservoir, a line for introducing the driving fluid under pressure into the chamber on one side of the piston to move it in a direction to overcome its bias and cause compression of the bellows and contraction of the ventilating gas reservoir.

3. The invention as defined in claim 2, in which the means biasing the piston in a direction to cause extension of the bellows is a spring.

4. The invention as defined in claim 2, in which the means biasing the piston includes a second line for introducing fluid under pressure into the chamber on the other side of the piston.

5. The invention as defined in claim 1, in which the variable volume ventilating gas reservoir comprises a bellows, in which the means for alternately expanding and contracting the volume of the ventilating gas reservoir comprises a body having a chamber and a piston reciprocally mounted within the chamber, the piston being coupled to the bellows, a first line for introducing driving fluid under pressure into the chamber on one side of the piston to move it in a direction to cause compression of the bellows and contraction of the ventilating gas reservoir, a second line for introducing driving fluid under pressure into the chamber on the other side of the piston to move it in a direction to cause extension of the bellows and expansion of the ventilating gas reservoir, and two-position valve means having one position that connects the first line to the source of fluid pressure and the second line to the atmosphere, and having a second position that connects the second line to the fluid pressure source and the first line to the atmosphere.

6. The invention as defined in claim 2, which includes valve means in the line having one position that admits fluid under pressure to the chamber from the fluid pressure source and having a second position that disconnects the fluid pressure source from the line and opens the line to the atmosphere, thereby allowing fluid under pressure to leave the chamber, and permits the biasing means to move the piston in a direction to extend the bellows and expand the ventilating gas reservoir.

7. The invention as defined in claim 6, which also includes a flow control valve in the line to independently control the rate of fluid flow when the valve means is in one position and a second flow control valve to independently control the rate of fluid flow when the valve means is in the second position.

8. The invention as defined in claim 6, which also includes a movable pilot for setting the position of the valve means in the one position or the second position, pressure actuated means for moving the pilot responsive to the position of the bellows, whereby when the bellows is fully extended the pilot moves the valve means to the first position and when the bellows is fully retracted the pilot moves the valve means to the second position.

9. The invention as defined in claim 8, in which the pilot includes a fluid pressure actuated reciprocating piston mechanically linked to the valve means and having two positions whereby when the piston moves to one position the valve means is moved to the first position and when the piston is moved to the second position the valve means is moved to the second position, means for admitting fluid under pressure from the fluid pressure source to both sides of the pilot piston to equalize the pressure on each side of the piston, a first bleeder line from one side of the pilot piston, and a second bleeder line from the other side of the pilot piston, the first bleeder line terminating in a bleeder valve and the second bleeder line terminating in a second bleeder valve, the first bleeder valve being momentarily opened responsive to complete extension of the bellows and releasing the fluid pressure in the first bleeder line, thereby unbalancing the pilot piston and causing it to move to the first position, whereby the valve means is also moved to the first position and fluid under pressure is admitted to the chamber causing compression of the bellows, the second bleeder valve being momentarily opened responsive to complete compression of the bellows thereby releasing pressure and causing the pilot to move to the second position which causes the valve means to move to the second position and release fluid under pressure in the line which permits bellows to extend once more.

10. The invention as defined in claim 1, in which the non-breathing valve means is a double acting, two-position valve means located in the ventilating gas supply conduit between the ventilating gas supply port and the patient, the valve means being open to the ventilating gas supply conduit during contraction of the ventilating gas reservoir to allow ventilating gas to pass to the patient but closed to exhaust, and the valve means being closed to the ventilating gas supply conduit during expansion of the ventilating gas reservoir but open to exhaust.

11. In a mechanical ventilator for supplying ventilating gas to a patient:
(a) a patient circuit including a ventilating gas supply conduit for conducting ventilating gas to the patient, a ventilating gas supply port for supplying ventilating gas to the ventilating gas supply conduit, and a variable volume ventilating gas reservoir forming a portion of the ventilating gas supply conduit;
(b) means for expanding the volume of the ventilating gas reservoir, a source of driving fluid under pressure, the fluid being isolated from the ventilating gas, means for contracting the volume of the ventilating gas reservoir responsive to driving fluid pressure;
(c) a first limit means for volumetrically limiting the expansion of the ventilating gas reservoir, and a second limit means for volumetrically limiting the contraction of the ventilating gas reservoir;
(d) adjustable pressure-responsive means responsive to and actuated by ventilating gas pressure in the patient circuit;
(e) the pressure-responsive means having a variable setting that can be preset to respond when a predetermined maximum ventilating gas pressure value builds up in the patient circuit caused by increasing impedance in the patient;
(f) a third limit means actuated by response of the pressure-responsive means to limit further contraction of the ventilating gas reservoir before the volumetric limit on contraction imposed by the second limit means is reached;
(g) a control means actuated responsive to actuation of the third limit means, the control means, when actuated, releasing driving fluid pressure from the means for contracting the ventilating gas reservoir, thereby causing expansion of the ventilating gas reservoir to immediately commence;
(h) whereby the ventilating gas reservoir volume-cycles with a constant stroke-volume and supplies a constant amount of ventilating gas to the patient over a given time interval until the predetermined maximum pressure value is reached responsive to increasing impedance in the patient when the reservoir, upon response of the pressure-responsive means and actuation of the third limit means and control means, automatically pressure-cycles with a variable stroke-volume in which the stroke-frequency increases proportionately with the decrease of stroke to effectively maintain substantially the same constant amount of ventilating gas over a given time interval to the patient, but at a safety limited maximum pressure, until patient impedance decreases sufficiently to cause the ventilating gas pressure to remain below the predetermined maximum pressure value, and the reservoir automatically resumes cycling with a constant stroke-volume.

12. The invention as defined in claim 6, which also includes adjustable control means for controlling the rate at which fluid under pressure is admitted to the chamber and thereby the rate at which the ventilating gas reservoir is contracted, and a second adjustable control means for controlling the rate at which fluid under pressure is released from the chamber, and thereby the rate at which the ventilating gas reservoir expands.

13. The invention as defined in claim 11, which also includes bleeder valve means for instantaneously bypassing the second adjustable control means for controlling the rate at which fluid under pressure is released from the chamber at the start of expansion of the ventilating gas reservoir, whereby there is deliberately caused an initial accelerated expansion of the reservoir, means for holding the bleeder valve open for a controlled time interval and then permitting it to close, whereby the second adjustable control means controls the rate of expansion of the reservoir at a predetermined slower rate thereafter.

14. The invention as defined in claim 1, in which once the reservoir begins cycling with a variable stroke-volume, an audible signal is developed through fluttering of the non-rebreathing valve means while effective ventilation of the patient continues, the audible signal intensity increasing with decreasing stroke-volume caused by increasing patient impedance, whereby the audible signal serves as an indicator of the condition of the patient.

15. A mechanical ventilator for supplying ventilating gas to the lungs of the patient comprising:
(a) a ventilating gas supply conduit for conducting ventilating gas to a patient including a variable volume ventilating gas reservoir;
(b) a source of driving gas under pressure and isolated from the ventilating gas;
(c) means for expanding the volume of the ventilating gas reservoir;
(d) means for contracting the volume of the ventilating gas reservoir responsive to driving gas pressure;
(e) adjustable restriction means for selectively restricting the flow of driving gas to permit independent control of the rate of expansion and contraction of the reservoir;
(f) a ventilating gas supply port with check valve means for opening and closing the port responsive to expansion and contraction of the reservoir;
(g) a non-rebreathing valve means for conducting exhaled gas away from the patient;
(h) a first limit valve means for volumetrically limiting expansion of the ventilating gas reservoir, and a second limit valve means for volumetrically limiting the contraction of the ventilating gas reservoir; and means for causing expansion to commence without significant time delay when the volumetric limit on contraction is reached;
(i) a ventilating gas pressure-responsive means with a variable setting that can be set to respond when a predetermined maximum ventilating gas pressure value builds up in the ventilating gas supply conduit caused by increasing impedance of the patient;
(j) a third limit means actuated by response of the pressure-responsive means to limit further contraction of the ventilating gas reservoir before the volumetric limit on contraction imposed by the second limit means is reached;
(k) a control means actuated responsive to actuation of the third limit means, the control means, when actuated, releasing driving gas pressure from the means for contracting the ventilating gas reservoir, thereby causing expansion of the ventilating gas reservoir to immediately commence;
(l) whereby the ventilating gas reservoir volume-cycles with a constant stroke-volume and supplies a constant amount of ventilating gas to the patient over a given time interval until the predetermined maximum pressure value is reached responsive to increasing impedance in the patient, when the reservoir, upon response of the pressure-responsive means and actuation of the third limit means and control means, automatically pressure-cycles with a variable stroke-volume in which the stroke-frequency increases proportionately with decrease of stroke to effectively maintain substantially the same constant amount of ventilating gas over a given time interval to the patient, but at a safely limited maximum pressure, until the patient impedance decreases sufficiently to cause ventilating gas pressure to remain below the predetermined maximum pressure value, and the reservoir automatically resumes cycling with a constant stroke-volume.

16. A mechanical ventilator comprising:
(a) a ventilating gas supply conduit for conducting ventilating gas to an inhalating patient including a variable volume ventilating gas reservoir;
(b) reciprocating means for alternately contracting and expanding the ventilating gas reservoir including a body having a fluid chamber and a piston reciprocally mounted in the chamber and connected to the ventilating gas reservoir;
(c) a source of driving fluid under pressure;
(d) a driving fluid supply conduit for supplying driving fluid to the reciprocating means;
(e) a two-position valve means having a first position that admits driving fluid under pressure to the fluid chamber to move the piston in a direction to cause contraction of the ventilating gas reservoir and a second position that closes the driving fluid supply conduit to the source of fluid pressure and opens the fluid chamber to atmospheric pressure permitting the ventilating gas reservoir to expand;
(f) a differential-pressure-actuated two-position movable pilot operably connected to the valve means, the pilot including a housing having a chamber and a reciprocating slide within the chamber, the pilot chamber being open to the fluid pressure source on both sides of the slide to equalize pressure on the slide;
(g) a first limit valve actuated responsive to maximum contraction of the ventilating gas reservoir to reduce pressure on one side of the pilot slide causing the slide to move toward its low pressure side and to shift the valve means to its second position responsive to such movement;
(h) a second limit valve actuated responsive to maximum expansion of the ventilating gas reservoir to reduce pressure on the other side of the pilot slide causing the slide to move toward the low pressure side and to shift the valve means to its first position responsive to such movement;
(i) an adjustable pressure-responsive means actuated by the ventilating gas pressure in the ventilating gas supply conduit;
(j) a third limit valve actuated by the pressure-responsive means that reduces pressure on one side of the pilot side before full contraction of the ventilating gas reservoir is reached and causes the pilot to shift the valve means to its second position, thereby initiating expansion of the ventilating gas reservoir before the volumetric limit on contraction imposed by the second limit valve is reached;
(k) whereby the ventilating gas reservoir cycles with a constant stroke-volume and supplies a constant amount of ventilating gas to the patient over a given time interval when the ventilating gas pressure is below the setting of the adjustable pressure-responsive means, and when the ventilating gas pressure is above this setting, the reservoir automatically pressure-cycles with a variable stroke-volume in which the stroke-frequency increases proportionately with decrease of stroke-volume to effectively deliver a substantially constant amount of ventilating gas over a given time interval, but at a safely limited maximum pressure, until the patient impedance drops sufficiently to cause the ventilating gas pressure to remain below the predetermined maximum pressure value, and the reservoir automatically resumes cycling with a constant stroke-volume.

References Cited by the Examiner

UNITED STATES PATENTS

| | | | |
|---|---|---|---|
| 2,063,043 | 12/1936 | McKesson | 128—29 |
| 2,267,009 | 12/1941 | Adolphsen et al. | 128—185 |
| 2,615,463 | 10/1952 | Burns | 128—29 |
| 2,887,104 | 5/1959 | Sovinsky et al. | 128—29 |
| 3,046,979 | 7/1962 | Andreasen | 128—29 |
| 3,067,760 | 12/1962 | Haverland et al. | 128—29 |
| 3,071,131 | 1/1963 | Johannisson et al. | 128—29 |
| 3,164,149 | 1/1965 | White et al. | 128—29 |

FOREIGN PATENTS 875,790  8/1961  Great Britain.

RICHARD A. GAUDET, *Primary Examiner.*